No. 677,692. Patented July 2, 1901.
P. PAULI & C. KRAUSS.
PROCESS OF MAKING SULFUR TRIOXID.
(Application filed Apr. 20, 1898.)
(No Model.)
Fig: 1
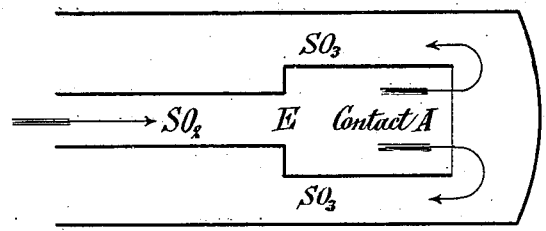
Fig: 2.
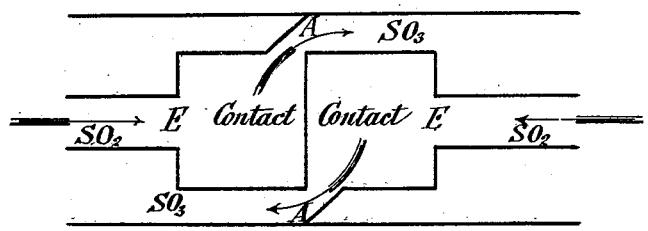
Witnesses Philipp Pauli and Constantin Krauss, Inventors
By their Attorneys

UNITED STATES PATENT OFFICE.

PHILIPP PAULI AND CONSTANTIN KRAUSS, OF HÖCHST-ON-THE-MAIN, GERMANY, ASSIGNORS TO THE FARBWERKE, VORM. MEISTER, LUCIUS & BRÜNING, OF SAME PLACE.

PROCESS OF MAKING SULFUR TRIOXID.

SPECIFICATION forming part of Letters Patent No. 677,692, dated July 2, 1901.

Application filed April 20, 1898. Serial No. 678,254. (No specimens.)

*To all whom it may concern:*

Be it known that we, PHILIPP PAULI and CONSTANTIN KRAUSS, doctors of philosophy, subjects of the Emperor of Germany, residing at Höchst-on-the-Main, Germany, have invented certain new and useful Improvements in the Manufacture of Sulfur Trioxid, (Sulfuric Anhydrid,) of which the following is a specification.

This invention relates to the production of sulfur trioxid, (sulfuric anhydrid.)

The manufacture of sulfur trioxid (sulfuric anhydrid) consists, as is known, in treating sulfurous anhydrid (sulfur dioxid) together with the requisite oxygen and conducting the hot mixture over or through a contact-body. The supply of heat required for the reaction necessitated hitherto the use of complicated machinery, as well as a great amount of fuel. We have discovered that this machinery may in great part be dispensed with, thus enabling a great economy of fuel to be effected if the counter-current principle or other means be used, so that the heat of combination set free by the reaction of $SO_2 + O = SO_3$ be employed for heating the entering gas-current. The following example illustrates one arrangement for utilizing the heat of combination according to this method:

In a counter-current apparatus, Figures 1 and 2 of the accompanying drawings, are first heated to the temperature necessary for the reaction the entering gases containing $SO_2 + O$ by a direct supply of heat. As the mixture passes through the contact substance oxidation to $SO_3$ takes place, and consequently the heat of combination is set free. Thus gases containing $SO_3$ and passing away at A from the contact-body have a much higher temperature than the gases containing $SO_2$ entering at E. The gases containing $SO_3$ are then caused to meet those containing $SO_2$, and the considerable fall in the temperature which occurs insures a transference of heat from the gases passing away to those entering the contact-body.

The equipoise of the process is easily and quickly obtained by the increase or decrease of the entering quantity of gas. The process can be carried out at any pressure and best at a plus pressure. At the same time it is immaterial whether the counter-current be produced directly, as in Fig. 1, or alternately, as in Fig. 2, by a bi or poly division of the system. The gases passing away and containing the heat of combination may also be employed in another way—for instance, by a regenerative system for heating the entering gases. Large apparatus, such as are used industrially, work, once the process is in action, entirely without supply of heat from outside. Our method, in contrast with those hitherto known, requires, therefore, an installation for heating and a consumption of fuel merely for the starting of the process. This means not only a considerable economy of direct expense, but also a simplification of the apparatus and reduction of wages.

By this new method sulfur trioxid (sulfuric anhydrid) can be manufactured at so low a price that it is worth while to transform it into ordinary sulfuric acid, as is obtained by the chamber process and platinum apparatus, &c. The present process represents, therefore, a new and technically important mode of obtaining sulfur trioxid (sulfuric anhydrid) which may be used for making sulfuric acid in the known manner.

We are aware of the patent issued to Rudolph Knietsch, No. 652,119, dated June 19, 1900, and hereby disclaim the invention covered by said patent.

Having now described our invention, what we claim is—

The herein-described process of making sulfuric anhydrid, which consists in passing a heated gas containing sulfur dioxid and oxygen through a contact substance, and then removing from the thus-produced sulfuric anhydrid the heat of reaction, by conducting the same, after passing the contact substance, in proximity to an ingoing quantity of cooler sulfur dioxid and air, whereby an exchange of heat is effected, substantially as set forth.

In testimony that we claim the foregoing as our invention we have signed our names in presence of two subscribing witnesses.

PHILIPP PAULI.
CONSTANTIN KRAUSS.

Witnesses:
HEINRICH HAHN,
BERNHARD LEYDECKER.